United States Patent [19]

Hübner

[11] Patent Number: 4,526,028

[45] Date of Patent: Jul. 2, 1985

[54] PROCESS AND DEVICE FOR INDICATING AND EVALUATING ENVIRONMENTAL PARAMETERS

[76] Inventor: Hans J. Hübner, Katthagen 24, 4400 Münster, Fed. Rep. of Germany

[21] Appl. No.: 493,696

[22] Filed: May 11, 1983

[30] Foreign Application Priority Data

May 12, 1982 [DE] Fed. Rep. of Germany ....... 3217798

[51] Int. Cl.³ ............................................ G01N 31/00
[52] U.S. Cl. ...................................... 73/23; 340/632; 346/14 MR
[58] Field of Search .......................... 73/23, 863, 1 G; 340/632, 633, 634; 346/14 MR, 59, 60; 364/497, 498, 499

[56] References Cited

U.S. PATENT DOCUMENTS

| | | | |
|---|---|---|---|
| 3,415,108 | 12/1968 | Hubner | 73/23 |
| 4,133,034 | 1/1979 | Etter | 346/14 MR |
| 4,368,519 | 1/1983 | Kennedy | 346/14 MR |
| 4,415,853 | 11/1983 | Fisher | 346/14 MR |
| 4,419,211 | 12/1983 | Brauer | 73/23 |
| 4,443,791 | 4/1984 | Risgin et al. | 73/23 |

FOREIGN PATENT DOCUMENTS 1598520  7/1973  Fed. Rep. of Germany .
1462480  1/1977  United Kingdom .

Primary Examiner—Stephen A. Kreitman
Attorney, Agent, or Firm—Karl F. Ross; Herbert Dubno

[57] ABSTRACT

A multiplicity of environmental parameters, such as composition of the ambient atmosphere, temperature and air pressure, are concurrently measured with a portable device and registered together with information giving time and location of each measurement. The readings are interrelated parameters, e.g. temperature and relative humidity, may be jointly evaluated with adjustment of the stored values in light of one another; they may also be subjected to other corrections such as linearization, averaging or logarithmic conversion. A keyboard on the device enables the instantaneous readout of a selected parameter on a common display panel; detection of dangerous concentrations of noxious gases, e.g. firedamp in a coal mine, sets off an alarm.

11 Claims, 6 Drawing Figures

PROCESS AND DEVICE FOR INDICATING AND EVALUATING ENVIRONMENTAL PARAMETERS

SPECIFICATION

1. Field of the Invention

My present invention relates to a process for gathering information on environmental conditions as well as to a portable device adapted to measure selected parameters pertaining to these conditions.

2. Background of the Invention

The measuring of environmental parameters, either for immediate observation or for subsequent evaluation, is important in many instances. Thus, for example, the atmosphere of a coal mine must be monitored continuously for possible concentrations of fire-damp or other noxious gases while a record should also be kept of conditions existing at various times on a particular site. This recording has heretofore generally been done by hand, in a mine log pertaining to a given location, for subsequent review and comparison with existing standards to enable the institution of measures for improving operations (e.g. by providing better ventilation) and preventing possible accidents. The immediate observation of such data, of course, provides a timely warning of impending danger.

Situations exist when the reading of a mere numerical value of a given parameter does not supply sufficient information for determining whether operating conditions are satisfactory or not. Thus, for example, ambient temperature alone is not necessarily a measure of comfort or discomfort since relative humidity and windchill factor ought to be taken into accident. Also, barometric pressure may have to be referred to elevation above sea level in order to be relevant. Deviations from a norm in, say, the measured concentration of a certain gas may be due to a localized variation so that such readings may have to be averaged over a certain time period and/or for different locations.

OBJECT OF THE INVENTION

An important object of my present invention, therefore, is to provide a process for gathering such data with the aid of a portable instrument in a manner furnishing not only information immediately available but also a record for subsequent evaluation, preferably with the aid of a processor.

A related object is to provide a device for implementing this process.

SUMMARY OF THE INVENTION

A process for gathering information on environmental conditions in accordance with my present invention, using a portable instrument adapted to sense various parameters, comprises the steps of measuring a selected parameter, displaying same, entering time and place of measurement on a recording medium along with the measured value, and subsequently evaluating the data so registered.

For the reasons discussed above, it will be desirable in many instances to subject the measured value to a certain adjustment before displaying or at least before recording it. Specific instances of such an adjustment involve a modification in light of other measured parameters or a linearization of a curve interpolated from scattered values.

According to another aspect of my invention, a device for gathering information of the type discussed above comprises a portable base carrying measuring means for detecting the magnitude of selected environmental parameters as well as chronometric means and storage means, the latter being coupled with the measuring and chronometric means for registering a detected magnitude together with the time of detection on a recording medium. The base further carries coding means, such as a keyboard, for additionally registering on that recording medium the location of the apparatus at the instant of detection. Advantageously, a keyboard used for this purpose is designed to command the registration of a detected magnitude only after registration of a location code on the recording medium.

More particularly, the keyboard may be operable to call forth the detected magnitude of a selected parameter and to display same visually whereupon the user can decide whether or not the displayed value should be recorded. I further prefer to provide the device with threshold means coupled to the measuring means for emitting an alarm signal in response to a detected magnitude which exceeds a predetermined limiting value for the respective parameter. Such an alarm signal could be emitted in response to or independently of any manual operation of a keyboard or other coding means to be handled by the user. However, in order to prevent an untimely generation of an alarm as a result of an erratic measurement, or one failing to take additional factors into account, adjustment means designed to modify a detected magnitude in light of other information may be interposed between the measuring means and the threshold means.

At the end of a day, or at other appropriate times, several devices according to my invention could be plugged into a common processor for a joint evaluation of data registered on their respective recording media.

BRIEF DESCRIPTION OF THE DRAWING

The above and other features of my invention will now be described in detail with reference to the accompanying drawing in which.

SPECIFIC DESCRIPTION

Figure 1:
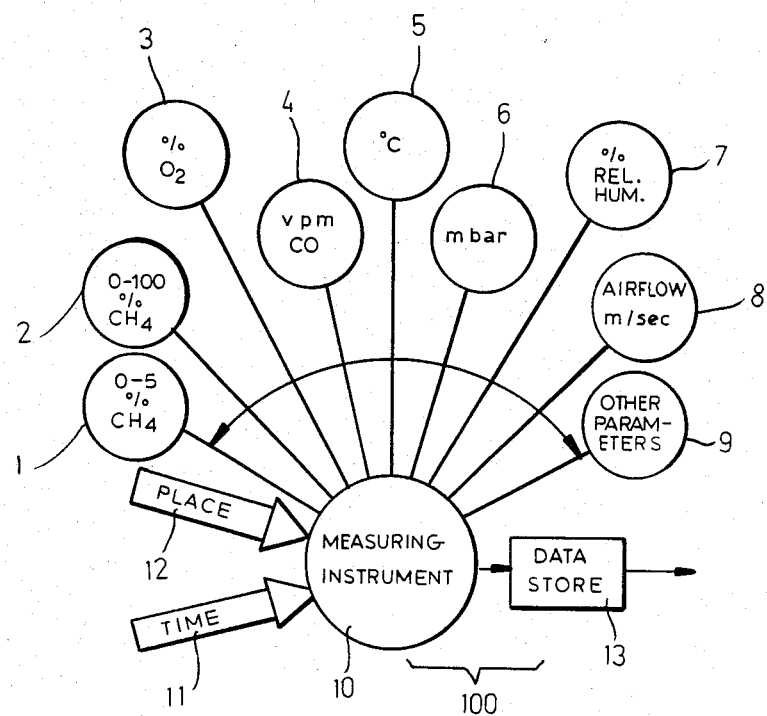
FIG. 1 is a schematic view of a measuring instrument used for the gathering of information on environmental conditions in accordance with my present invention.

FIG. 1 schematically shows a measuring instrument 10 responsive to a variety of ambient parameters to be registered in a data store 13. Reference in this connection may be made, for example, to German Pat. No. 15 98 520. The instrument 10 has inputs respectively connected to a plurality of sensor 1–9. Sensors 1 and 2 measure the concentration of methane in the atmosphere on two different scales, sensor 1 giving readings of 0 to 5% while sensor 2 measures between 0 to 100%. Sensor 3 supplies the percentage of oxygen, sensor 4 determines the concentration of carbon monoxide in terms of volume per million, sensor 5 measures degrees C., sensor 6 reads atmospheric pressure in millibars, sensor 7 gives the percentage of relative humidity and sensor 8 detects airflow in meters per second. Sensor 9 may measure some other parameter required for a particular field of use. Time and place information are fed into the instrument, in a manner described hereinafter, as respectively indicated at 11 and 12.

Figure 2:
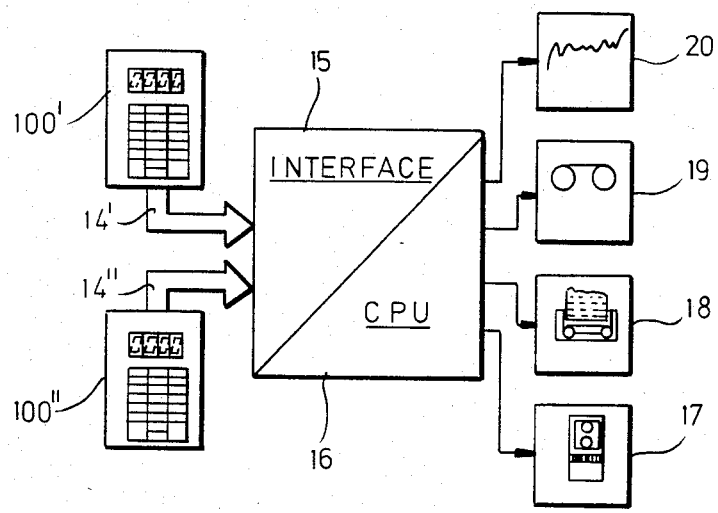
FIG. 2 diagrammatically illustrates an assembly of several devices according to my invention, each including an instrument as shown in FIG. 1, coupled to a common processor for the joint evaluation of their data.

Instrument 10 and data store 13 form part of a device 100; two such devices 100', 100" with outputs 14' amd 14" are shown connected in FIG. 2 to an interface 15 feeding a central processing unit 16 coupled to an external computer 17. Several peripheral units connected to outputs of CPU 16 include a printer 18, a recorder 19 and a user terminal 20. The data stores 13 (FIG. 1) of devices 100' and 100" and others connectable to interface 15 should, of course, be suitably programmable as is well known in the microprocessor art. Each output 14', 14" may comprise, for example, a panel on one of the minor sides of the rectangular base with a number of sockets into which corresponding connectors of interface 15 may be plugged.

Figure 3:
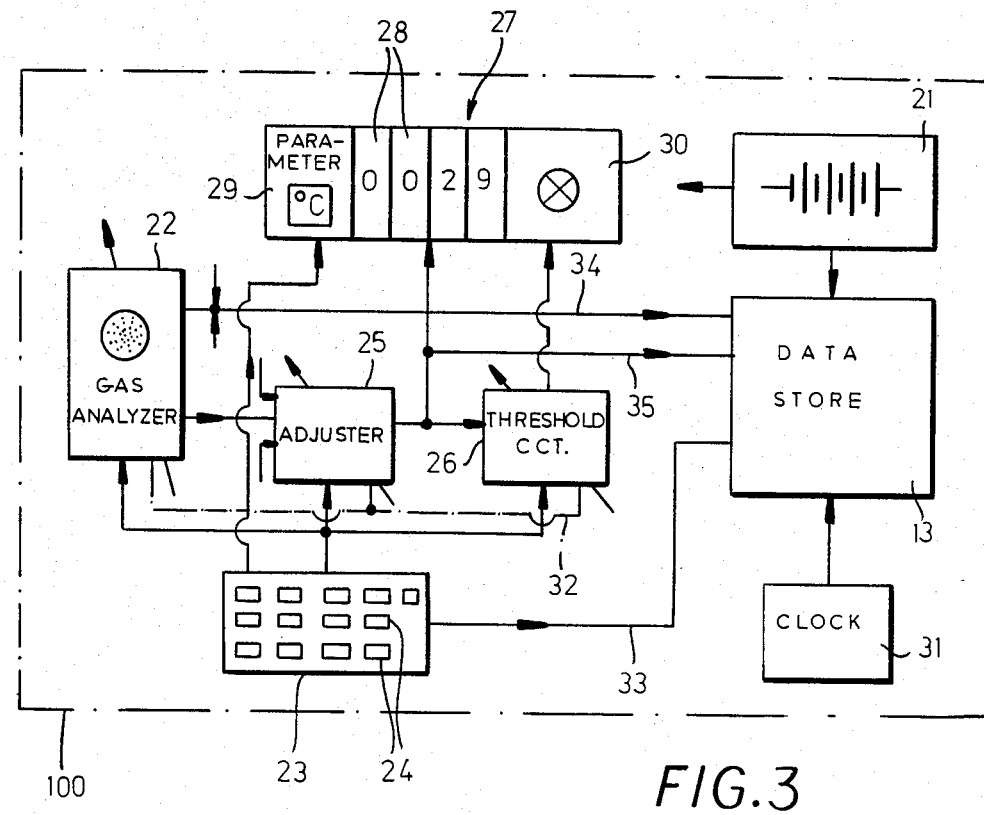
FIG. 3 is a block diagram of a device schematically illustrated in FIG. 2.

FIG. 3 shows details of a generic device 100 whose base, represented in phantom lines, carry the aforementioned data store 13 along with other components which form part of the measuring instrument 10 of FIG. 1. These components include a power source 21, shown schematically as a battery, supplying the data store 13 and the rest of the device with operating current. A gas analyzer 22, representative of the various sensors discussed with reference to FIG. 1, works via an adjuster 25 into a threshold circuit 26 which energizes an alarm 30 when the output signal of analyzer 22, as modified by that adjuster, exceeds a predetermined safe level. The adjuster may be subdivided into a plurality of units assigned to different parameters for individually modifying them; some, of course, could be left unmodified. The signal levels of analyzer 22, adjuster 25 and threshold circuit 26 may be manually adjusted, possibly with the aid of a common manipulator as schematically indicated at 32, in conformity with different operating conditions. A keyboard 23 with keys 24 serves for the activation of a display unit 27 which includes a digital indicator 28 and a parameter selector 29 in addition to the alarm lamp 30. Analog signals from analyzer 22, and from other sensors (not shown in FIG. 3) included in the measuring instrument, are digitized within adjuster 25. Also shown is a clock 31 delivering time information to data store 13.

Figure 4:
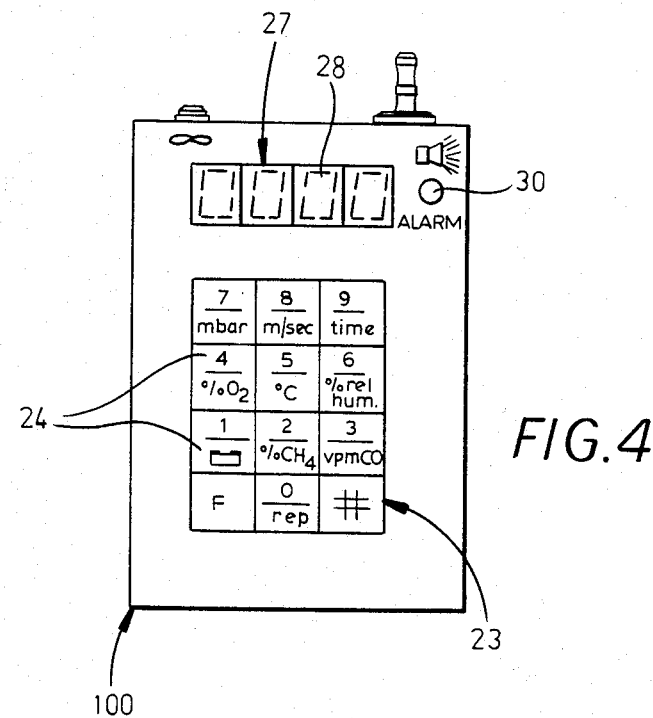
FIG. 4 is a more detailed face view of such a device.

Keyboard 23 is shown to have twelve keys 24 with functions indicated in FIG. 4, ten of them bearing the digits from 0 through 9 along with other legends. A function key at lower left and a numbers key at lower right enable a shift between the two markings, the function key F enabling a selection of a particular parameter to be read out from gas analyzer 22 or from one to the other sensors for display on indicator 28. The selected parameter (e.g. °C.) appears in the field 29 of display 28. The symbol under digit "0" calls for a repeat of the measurement, that under digit "1" commands a recording in data store 13, and the legends under the remaining digits correspond to some of those indicated in FIG. 1.

When the numbers key # is depressed, the operator can dial a numerical code that identifies the location at which the measurement is being taken. The digital code is transmitted to the data store 13 via a line 33 (see FIG. 3) while other lines 34 and 35 respectively carry the identity of the activated sensor and the digitized output signal thereof as modified by adjuster 25. Data store 13 is advantageously provided with circuitry enabling the reception of information over lines 34 and 35 only after the arrival of a location code fed in via line 33; the time of the event available from clock 31 is also recorded. Thus, each data set registered on a tape or other recording medium is accompanied by the necessary time and location identification.

As noted earlier, gas analyzer 22 and other sensors (e.g. a temperature feeler) may also access the threshold circuit 26 independently of keyboard 23 to cause the emission of an alarm upon detection of a critical situation. Adjuster 25 may also be settable, e.g. via linkage 32, to pass the sensed data without modification to indicator 28, threshold circuit 26 and data store 13.

Power supply 21, which preferably is a rechargeable battery, may serve as a principal current source but could also be used as a standby when the network is connectable to a utility outlet.

Figure 5:
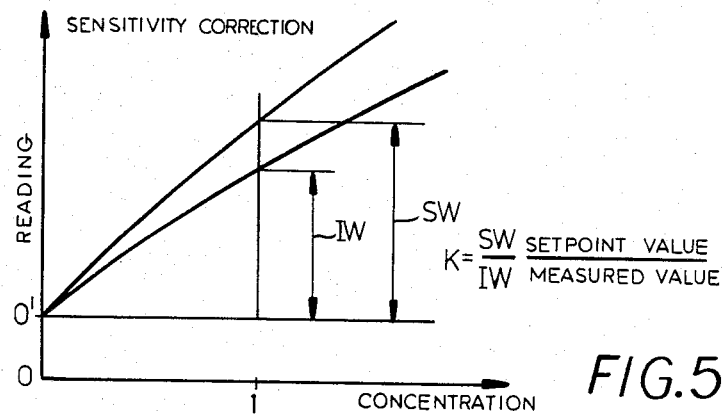
FIGS. 5 and 6 are graphs representing possible data modifications in a device according to my invention.
Figure 6:
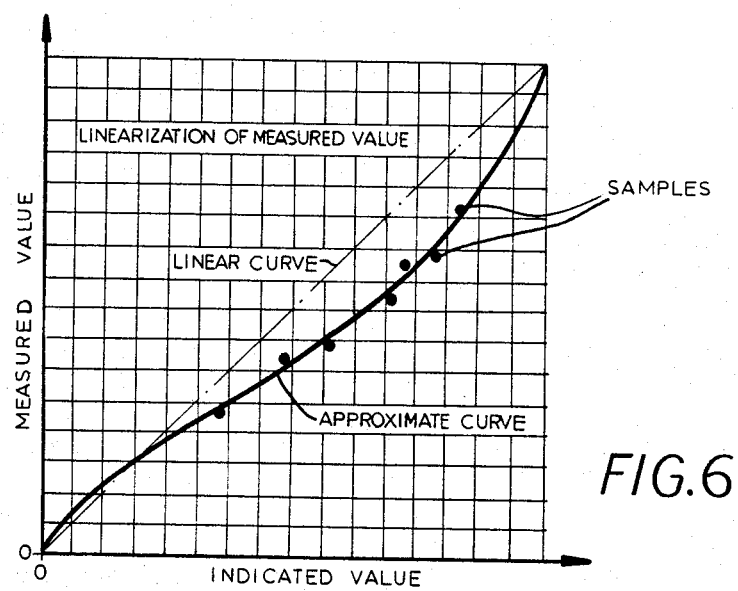

Adjuster 23, which may be programmable microprocessor, could operate as an integrator averaging a succession of values, a modifier taking other parameters into account (e.g. relative humidity in the case of temperature measurements), or a converter of absolute values to a logarithmic scale, for example. A particular instance represented in FIG. 5 involves corrections of sensitivity with rising concentration of a gaseous component being sampled, with multiplication of a measured value IW by a corrective factor $K=SW/IW$ where SW is a setpoint value to be read on the indicator 28. FIG. 6 shows the linearization of an approximate curve synthesized from a number of separately registered samples.

The processor 15, 16 illustrated in FIG. 2 could also be used for reprogramming the adjusters 25 of the devices 100', 100" connected thereto.

I claim:
1. A device for gathering information on enviromental conditions, comprising:
   a portable base;
   measuring means on said base for detecting the magnitudes of selected environmental parameters;
   chronometric means on said base;
   storage means on said base coupled with said measuring and chronometric means for registering a detected magnitude of a selected one of said environmental parameters together with the time of detection on a recording medium;
   coding means on said base for additionally registering on said recording medium the location of a device at the instant of said detection; and
   adjustment means interposed between said measuring means and said threshold means for modifying a detected magnitude in light of other information, said adjustment means including means for selecting among parameter-specific items modifying information for a particular one of said environmental parameters and thereby modifying the detected magnitude with the selected information and for changing said items among which selection is made.

2. A device as defined in claim 1 wherein said coding means is part of a keyboard operable to call forth the detected magnitude of a selected parameter from said measuring means.

3. A device as defined in claim 2, further comprising display means on said base for visually indicating a detected magnitude called forth by means of said keyboard.

4. A device as defined in claim 2 wherein said keyboard is operable to command the registration of a detected magnitude on said recording medium only after registration of a location code thereon.

5. A device as defined in claim 1, further comprising threshold means on said base coupled to said measuring means for emitting an alarm signal in response to a detected magnitude exceeding a predetermined limiting value for the respective parameter.

6. A device as defined in claim 5, further comprising joint resetting means for said measuring means, said adjustment means and said threshold means.

7. A device as defined in claim 5 wherein said measuring means includes a gas analyzer.

8. A device as defined in claim 1, further comprising a power supply on said base for the energization of said measuring and storage means.

9. In combination, a plurality of devices as defined in claim 1, a processor, and an interface unit for coupling said devices to said processor for a joint evaluation of data registered by said storage means thereof.

10. The device defined in claim 1 wherein said measuring means is constructed and arranged to provide the selected item of modifying information for modifying the detected magnitude of the selected environmental parameter.

11. The device defined in claim 1 wherein said adjustment means is a programmable microprocessor.

* * * * *